US010750599B1

(12) United States Patent
Simpkins et al.

(10) Patent No.: US 10,750,599 B1
(45) Date of Patent: Aug. 18, 2020

(54) WIRING DEVICE WITH REVERSIBLE LINE LOAD CONNECTIONS

(71) Applicant: Jasco Products Company LLC, Oklahoma City, OK (US)

(72) Inventors: Mark Simpkins, Stillwater, OK (US); Keith Lashley, Edmond, OK (US); Matthew Henson, Harrah, OK (US); Mitchell Davis, Edmond, OK (US)

( * ) Notice: Subject to any disclaimer, the term of this patent is extended or adjusted under 35 U.S.C. 154(b) by 0 days.

(21) Appl. No.: 16/383,634

(22) Filed: Apr. 14, 2019

(51) Int. Cl.
| | |
|---|---|
| *H05B 47/00* | (2020.01) |
| *H02J 1/06* | (2006.01) |
| *H01H 23/02* | (2006.01) |
| *H05B 47/19* | (2020.01) |
| *H01H 23/12* | (2006.01) |
| *H05B 47/11* | (2020.01) |
| *H05B 47/16* | (2020.01) |
| *H05B 47/105* | (2020.01) |

(52) U.S. Cl.
CPC ............ *H05B 47/19* (2020.01); *H01H 23/025* (2013.01); *H01H 23/12* (2013.01); *H02J 1/06* (2013.01); *H05B 47/105* (2020.01); *H05B 47/11* (2020.01); *H05B 47/16* (2020.01)

(58) Field of Classification Search
CPC ............ H05B 33/0815; H05B 33/0812; H05B 33/0845; H05B 33/0818; H05B 33/08; H05B 33/089; H05B 37/02; H05B 33/0842; H05B 39/048; H05B 6/666; H05B 33/0809; H05B 41/16; H05B 37/0272; H05B 37/0218; H05B 37/0227; H05B 37/0281; H02M 1/32; H02M 2001/0009; H02M 1/36; H02M 3/33569; H02M 3/33515; H02M 5/12; H02M 5/2573; H02J 1/08; H02J 1/06; H01H 23/025; H01H 23/12
See application file for complete search history.

(56) References Cited

U.S. PATENT DOCUMENTS

| | | | | |
|---|---|---|---|---|
| 5,194,858 | A * | 3/1993 | Erwin ................. | H02J 13/0096 307/140 |
| 6,700,333 | B1 * | 3/2004 | Hirshi ................ | H02M 5/2573 307/115 |
| 6,969,927 | B1 * | 11/2005 | Lee ........................... | H02J 3/14 307/17 |
| 7,221,106 | B1 * | 5/2007 | Nemir ................ | H02M 5/2573 315/291 |
| 7,531,921 | B2 * | 5/2009 | Cencur ............... | H03K 17/955 307/126 |

(Continued)

*Primary Examiner* — Vibol Tan
(74) *Attorney, Agent, or Firm* — William D. Popejoy

(57) ABSTRACT

A wiring device and method that control an amount of power delivered to a load, which maintain function even if a line connection and a load connection are reverse wired. Designed circuitry comprising steering diodes in both a line and a load wire direct a power source to an AC/DC power supply. The wiring device comprises a housing, a line terminal nominally designated for receiving electrical power from a power source, a load terminal nominally designated to feed electricity to a load, a neutral terminal, a line wire electrically connected to the line terminal, a load wire electrically connected to the load terminal, and a means for controlling an amount of power delivered to the load. Embodiments of the present invention include automated universal lighting controls, dimmers, timers, and wired lighting devices.

11 Claims, 4 Drawing Sheets

(56) References Cited

U.S. PATENT DOCUMENTS

| | | | | |
|---|---|---|---|---|
| 7,635,284 | B1* | 12/2009 | Nemir | H05B 47/185 |
| | | | | 439/646 |
| 7,868,561 | B2* | 1/2011 | Weightman | H05B 39/08 |
| | | | | 315/294 |
| 9,867,263 | B2* | 1/2018 | Avrahamy | H05B 39/086 |
| 2008/0001649 | A1* | 1/2008 | Cencur | H03K 17/955 |
| | | | | 327/517 |
| 2016/0295652 | A1* | 10/2016 | Zotter | H05B 33/0815 |
| 2017/0086281 | A1* | 3/2017 | Avrahamy | C02F 1/42 |

\* cited by examiner

WIRING DEVICE WITH REVERSIBLE LINE LOAD CONNECTIONS

BACKGROUND OF THE INVENTION

1. Field of the Invention

The present invention pertains to a wiring device and method for controlling an amount of power delivered to a load. More specifically the invention pertains to protective circuit arrangements in a wiring device to produce a normal electric working condition even when the line and load connections are reverse wired during installation.

2. Description of the Related Art

Wiring devices commonly have a line side, designed to receive power from a breaker panel or fuse box, and a load side, designed to distribute power to electrical components that use electrical energy and at least one conductive path between the line and load sides. Problems with wiring devices exist when the line and load connections are miswired. Typically, the wiring device will not function properly when the line and load connections are reversed. Additionally, the undesired abnormal electrical connection creates an unsafe electric working condition where the device becomes inoperable while electrical power is still present.

Identifying line and load lines can prove to be difficult since wires within a home or building are not always clearly or correctly marked. The time consuming multistep process of identifying which wire or wires carry power from a breaker panel and which wire or wires distribute power to a load often includes multiple trips to the breaker panel and/or the use of specific electrical equipment, such as a multimeter or voltage tester. Further, the problematic multistep installation process often creates an unsafe environment where an exposed wire with live current is accessible when young children, elderly, and other family members are in the home.

Miswiring still occurs even if the line and load lines are correctly identified. Improper identification of the line and load terminals of the wiring device may create connections where the line and load wires are reversed. Different methods have been used to prevent such a miswire, including: installation instruction manuals, online support, video instruction, labels, stickers, and markings. These methods are not always successful since they may be misread, misinterpreted, or ignored by the installer.

Persons having varying electrical proficiency perform installation of wiring devices, including: renters, single homeowners, contracted laborers, home renovators, electricians, and certified electricians. These persons perform installation within homes or buildings with different standards of electrical wiring and equipment. Often, the installation of wiring devices occurs in older homes and buildings that are not up to current electrical code.

SUMMARY OF THE INVENTION

Embodiments of the present invention are directed to wiring devices that control an amount of power delivered to a load, which maintain function even if the line and load connections are reverse wired. Designed circuitry comprising steering diodes in both the line and load wires direct the power source to an AC/DC power supply. The family of wiring devices comprises a housing, a line terminal nominally designated for receiving electrical power from a power source, a load terminal nominally designated to feed electricity to a load, and the means for controlling the amount of power delivered to the load. The wiring device may further comprise a neutral terminal and a traveler terminal.

The AC/DC power supply may comprise a half wave bridge rectifier with grounding of the DC current. The means for controlling the amount of power delivered to the load may comprise an air gap switch, a triac, and a coil; or a relay control circuit electrically connected to a relay switch.

One embodiment of the present invention is an automated universal lighting control with designed circuitry that allows the device to maintain function even if the line and load connections are reverse wired. The automated universal lighting control may be a dimmer switch that allows the user to control and adjust the brightness of any hard-wired, dimmable light.

Another embodiment of the present invention is directed to the method for controlling power delivered from a power source through a circuit that allows reversal of line and load connections of a wiring device. The method includes connecting steering diodes in the line and load wires to direct power to the AC/DC power supply. The method may further comprise converting an AC voltage signal into a DC voltage signal using a half wave rectifier, and grounding the DC current.

BRIEF DESCRIPTION OF THE DRAWINGS

One or more embodiments are illustrated by way of example, and not by limitation, reference will now be made to the accompanying drawings, having the same numeral designations to represent like elements throughout and wherein.

DETAIL DESCRIPTION OF THE INVENTION

The present invention seeks to overcome one or more of several problems, including but not limited to, the product failure and general unsafe electrical condition attributed to the reverse miswire of a wiring device.

Figure 1:
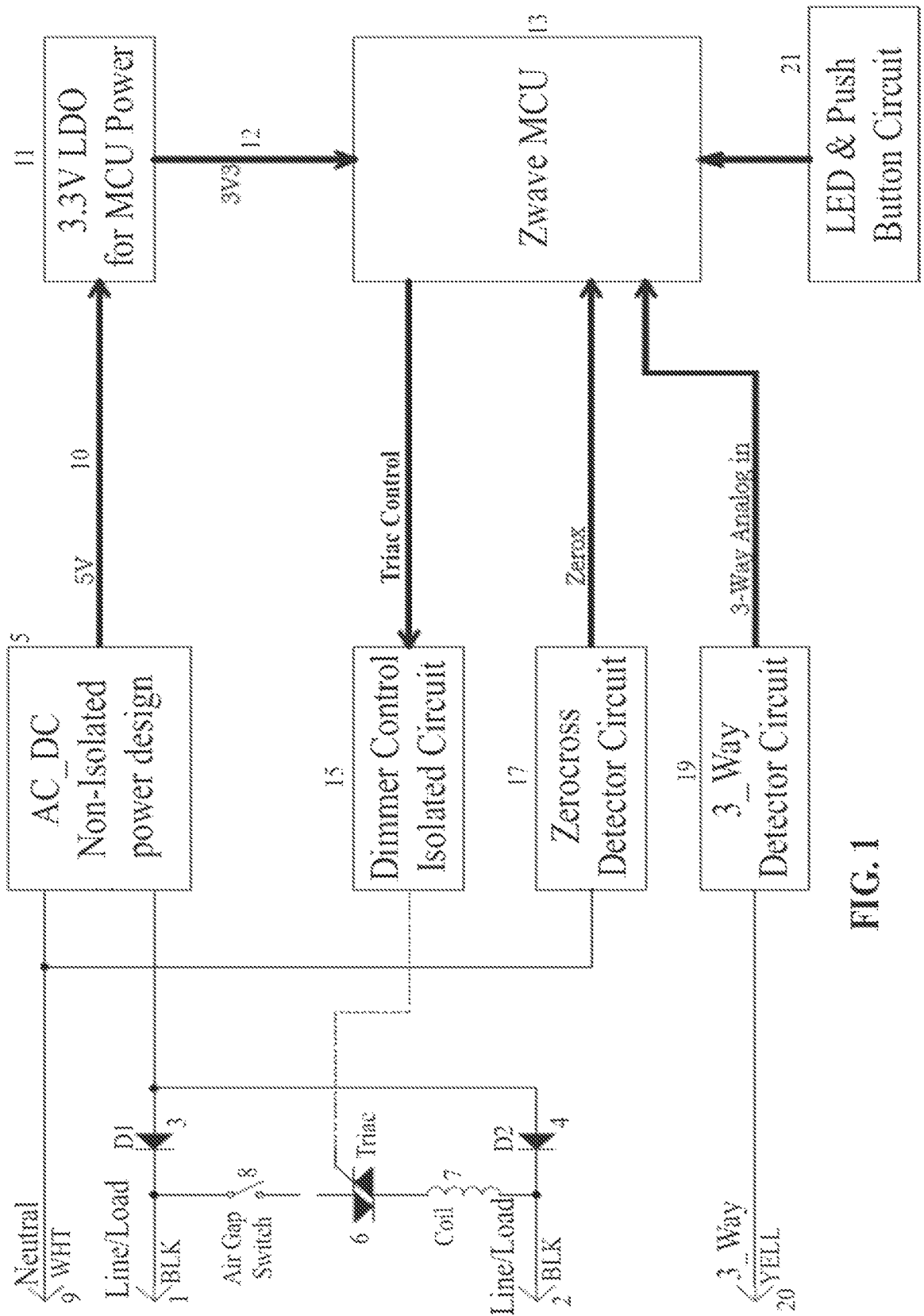
FIG. 1 is a schematic block diagram for an embodiment of the wiring device.

FIG. 1 is a schematic block diagram for one embodiment of a wiring device according to the present invention. The AC/DC non-isolated power design 5 receives AC power from a power source (not pictured) through a line wire 1, nominally designated, or a load wire 2, nominally designated. Either line wire 1 or load wire 2 may receive AC power from the power source, or may feed electricity to a load. Steering diode 3 is electrically connected to line wire 1, and directs AC power in the line wire 1 to the AC/DC non-isolated power design 5. Steering diode 4 is electrically connected to load wire 2, and directs AC power in the load wire 2 to the AC/DC non-isolated power design 5.

In FIG. 1, the embodiment utilizes a half wave rectifier to convert an AC voltage signal into a DC voltage. The half wave rectifier passes one half of the input sine wave and rejects the other half. Variations of this embodiment may use a full wave rectifier circuit. A full wave rectifier average output voltage is higher than the half wave rectifier, and the full wave rectifier produces a smoother output waveform.

An air gap switch 8, a triac 6, and a coil 7, are electronically connected in series to the line wire 1 and the load wire 2. The air gap switch 8 allows the user to disconnect AC power from the power source to work on an electrical component (not pictured) that consumes electricity without the danger of live voltage. For a specific example, a user may be able to change one or more light bulbs from an automated lighting control. The triac 6 conducts current in either direction and is gate controlled by the dimmer control isolated circuit 15. The coil 7 operates as an inductor by opposing the rate of change of current flowing through due to the build up of self-induced energy within its magnetic field.

In FIG. 1, the 5V line 10 supplies power to the 3.3V LDO 11, low-dropout regulator. The 3.3 V LDO 11 can regulate the output voltage even when the 5V line 10 supply voltage is very close in strength to the output voltage. The Z-wave micro controller unit 13 is powered by the 3V3 line 12, and receives input from a LED & push button circuit 21. The integrated LED indicator 32 and the push button 31 are both electrically connected to the LED & push button circuit 21. The Z-wave micro controller unit 13 communicates with the triac 6 through the dimmer control isolated circuit 15. A zerocross detector circuit 17 starts the triac 6 conducting when the load voltage is very close to crossing zero volts, which protects against sudden turn-on in the middle of a sine-wave cycle that may cause high frequency spikes or other difficult situations for the circuit. A neutral line 9 is electrically connected to the AC/DC non-isolated power design 5. A 3-way detector circuit 19 is electrically connected between the traveler line 20 and the Z-wave micro controller unit 13.

Figure 2:
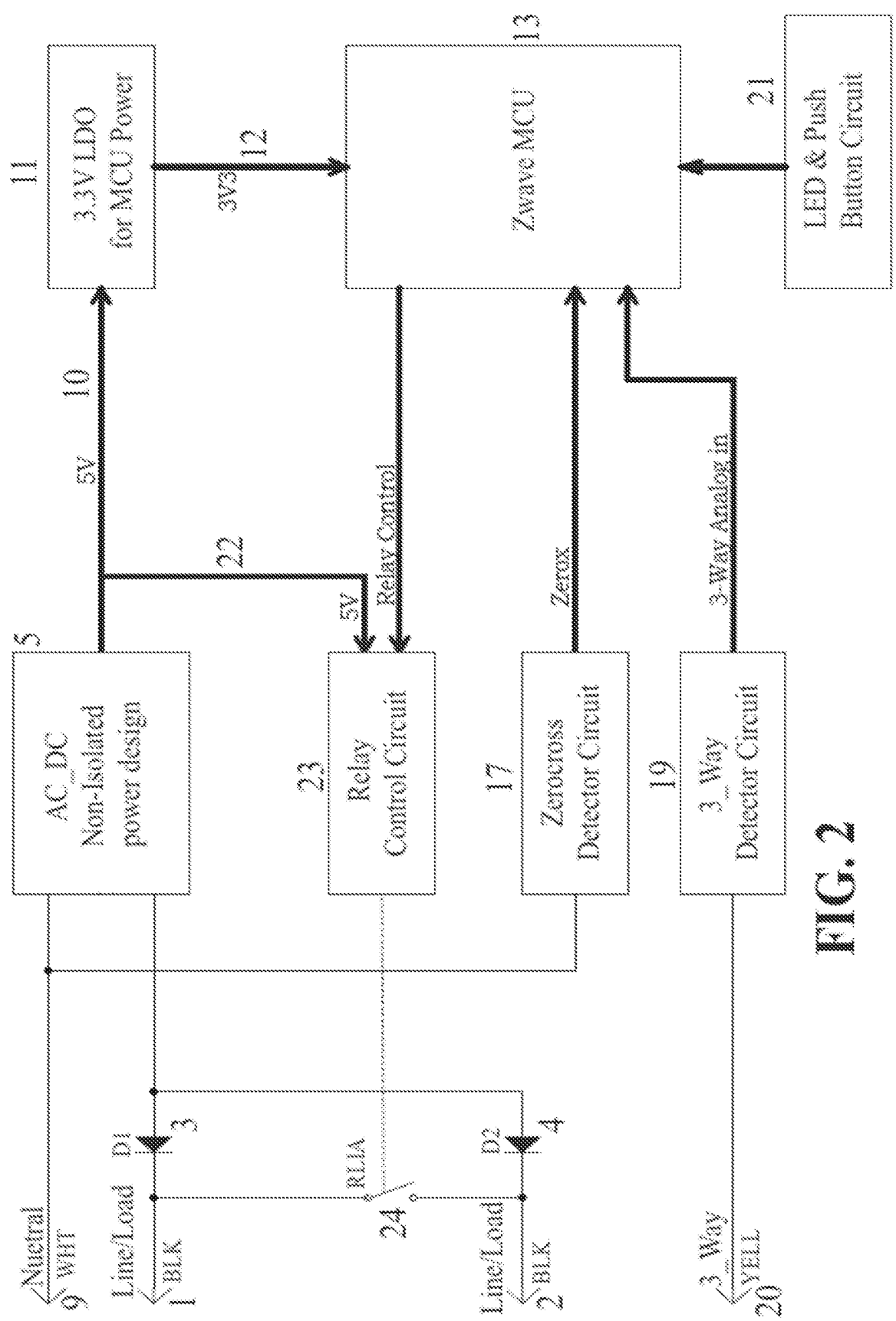
FIG. 2 is a schematic block diagram for another possible embodiment of the wiring device.

FIG. 2 is a schematic block diagram for another embodiment of a wiring device according to the present invention. The AC/DC non-isolated power design 5 receives AC power from a power source (not pictured) through a line wire 1, nominally designated, or a load wire 2, nominally designated. Either line wire 1 or load wire 2 may receive AC power from the power source, or may feed electricity to a load. Steering diode 3 is electrically connected to line wire 1, and directs AC power in the line wire 1 to the AC/DC non-isolated power design 5. Steering diode 4 is electrically connected to load wire 2, and directs AC power in the load wire 2 to the AC/DC non-isolated power design 5. A relay control circuit 23 is electrically connected to a relay switch 24, and opens or closes the relay switch 24 to allow an electric current to flow. The relay switch 24 is electrically connected between the line wire 1 and the load wire 2. The relay control circuit 23 is a circuit that controls the opening and closing of the relay switch 24 which in turn controls the power flow in the circuit. Another 5V line 22 electrically connected to the AC/DC non-isolated power design 5 supplies the relay control circuit 23 with electric power.

Figure 3:
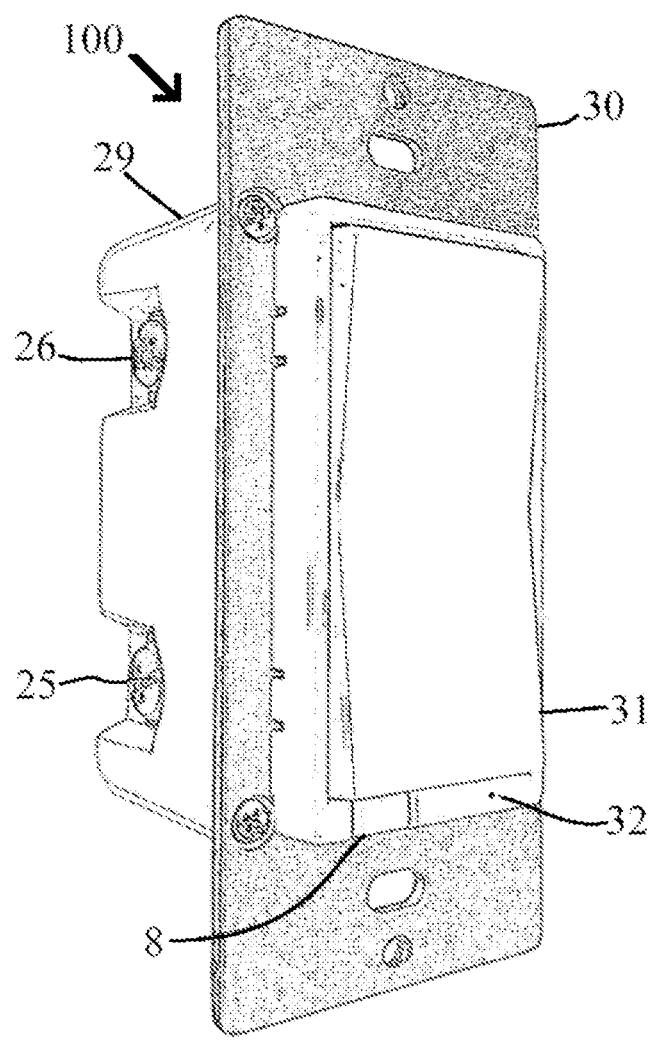
FIG. 3 is a front perspective view of an embodiment of the wiring device.

FIG. 3 is a front perspective view of an embodiment of the wiring device 100. A neutral terminal 25 electrically connects to a neutral wire 9 (not shown), and a traveler terminal 26 electrically connects to a traveler wire 20 (not shown). The neutral terminal 25 and the traveler terminal 26 extend through the housing 29. The traveler terminal 26 provides a user the ability to connect multiple switches to the wiring device 100 in multiple different configurations. The housing 29 is attached to the mounting bracket 30. The mounting bracket 30 attaches to any standard wall box. The push button 31 is mounted on the front side of the mounting bracket 30 and may be used to turn lighting on/off or adjust brightness levels. The push button 31 is connected to an on switch and an off switch. The wiring device 100 is easy to locate in a dark room with the integrated LED indicator 32. The air gap switch 8 is located on the front of the wiring device 100, below the push button 31, and allows the user to disconnect AC power from a power source (not pictured) to work on an electrical component that consumes electricity without the danger of live voltage.

In FIG. 3, the neutral terminal 25 and the traveler terminal 26 may be in the form of a screw. Screw terminal installation provides improved space efficiency when replacing existing switches compared to flying leads. The wiring device 100 may be an automated universal lighting control. The automated universal lighting control may be a Z-wave controlled dimmer switch that operates to turn lighting on/off or adjust brightness levels.

Alternate embodiments of the present invention may be constructed without a traveler terminal 26.

Figure 4:
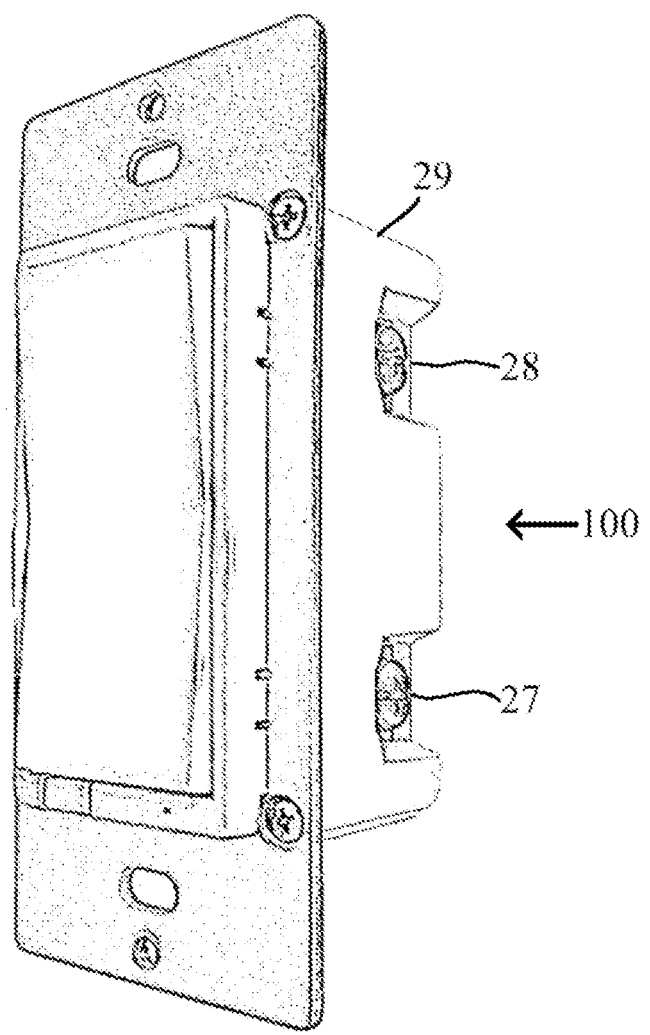
FIG. 4 is another front perspective view of the embodiment of the wiring device illustrated in FIG. 3.

FIG. 4 is another front perspective view of the embodiment of the wiring device 100 in FIG. 3. A line terminal 27 nominally designated for receiving electrical power from a power source electrically connects to the line wire 1 (not shown), and a load terminal 28 nominally designated to feed electricity to a load, electrically connects to the load wire 2 (not shown). The line terminal 27 and the load terminal 28 extend through the housing 29.

Dimers, switches, timers, and wired lighting devices that control an amount of power delivered to a load, which maintain function even if the line and load connections are reverse wired are all within the scope of this invention. Such wiring devices may communicate with other devices through wireless protocols including: Bluetooth, Z-wave, Zigbee, or WiFi. The wiring devices may be controlled with a remote, mobile device, or computer using any certified gateway. The wiring device may allow the user to schedule, control, and adjust the brightness of any hard-wired, dimmable light in a home, office, or building. The dimmer may be controlled in groups of multiple lights or turned on/off with ambient interior lighting scenes.

In one embodiment, the wiring device may further comprise one or more of the following: an occupancy sensor; a vacancy sensor; a motion sensor; and a light sensor. The occupancy sensor detects motion to automatically control lights, temperature systems, or ventilation systems. The occupancy sensor may use infrared, ultrasonic, microwave, or other technology. The term encompasses PIR sensors. The vacancy sensor operates similar to the occupancy sensor. However, the lights, temperatures systems, or ventilation systems must be manually turned on, but will automatically turn off when motion is no longer detected. The detection of motion and ambient light in an area provides a user the ability to control an amount of power delivered to a load based on the present environment.

In another embodiment, the wiring device may further comprise an illumination control means, which increases light output from a low light output to a high light output when motion is detected in an area. The wiring device may also include a delay timer, which allows the device to revert back to a low light output when motion is no longer detected in an area after a predetermined amount of time. The wiring device may include a multi-mode switch that allows a user to select from different modes of operation. The modes of operation allow a user to include or exclude the functions produced by one or more of the following: an occupancy sensor; a vacancy sensor; a motion sensor; a light sensor; and an illumination control means.

Although the present invention has been described in relation to particular embodiments thereof, many other variations and modifications will become apparent to those skilled in the art. It is preferred, therefore, that the present invention be limited not by the specific disclosure herein, but only by the appended claims. Alternate embodiments may be devised without departing from the spirit or scope of the invention. Further, the particular feature or structure may be combined in any suitable manner in one or more embodiments.

What is claimed is:

1. A wiring device for controlling an amount of power delivered to a load, comprising:
    a housing;
    a line terminal which extends through the housing nominally designated for receiving electrical power from a power source;
    a load terminal which extends through the housing nominally designated to feed electricity to a load;
    a neutral terminal;
    a traveler terminal;
    a line wire electrically connected to the line terminal;
    a load wire electrically connected to the load terminal;
    circuitry comprising one or more steering diodes in the line wire and a separate set of one or more steering diodes in the load wire to direct the power source to an AC/DC power supply, wherein the wiring device operates correctly even when a hot input source line in from a power box is reverse wired to the load terminal and a hot output load is reverse wired to the line terminal;
    means for controlling the amount of power delivered to the load; and
    the wiring device permanently attaches to a standard wall box.

2. The wiring device of claim 1, wherein said AC/DC power supply comprises a half wave bridge rectifier with the line as a DC ground.

3. The wiring device of claim 1, wherein said means for controlling the amount of power delivered to the load comprises:
    an air gap switch;
    a triac; and
    a coil.

4. The wiring device of claim 1, wherein said means for controlling the amount of power delivered to the load comprises:
    a relay control circuit; and
    a relay switch.

5. The wiring device of claim 1, wherein the wiring device is selected from a group comprising of an automated universal lighting control, a dimer, a switch, a timer, and a wired lighting device with remote.

6. The wiring device of claim 1, wherein the wiring device further comprises one or more of the following:
    a z-wave micro controller unit;
    a Bluetooth micro controller unit;
    a Zigbee micro controller unit; and
    a WiFi micro controller unit.

7. The wiring device of claim 1 further comprising a LED and push button circuit.

8. The wiring device of claim 1 as implemented into a wall receptacle.

9. The wiring device of claim 8 wherein said wall receptacle contains one or more electrical outlets.

10. A method for controlling an amount of power delivered to a load from a power source through a circuit that allows a wiring device which attaches permanently to a standard wall box to operate correctly even when a hot input source line in from a power box is reverse wired to the load terminal and a hot output load out is reverse wired to the line terminal, said method includes connecting one or more steering diodes in the line wire and a separate set of one or more steering diodes in the load wire to direct the power source to the AC/DC power supply.

11. The method of controlling power as recited in claim 10, further comprising:
    converting an AC voltage signal into a DC voltage signal using a half wave bridge rectifier; and
    grounding the DC current.

* * * * *